United States Patent
Hattori et al.

[11] Patent Number: 5,343,841
[45] Date of Patent: Sep. 6, 1994

[54] INTAKE CONTROL DEVICE OF INTERNAL COMBUSTION ENGINE

[75] Inventors: Isao Hattori, Gifu; Yurio Nomura, Nagoya; Shigeo Nomura, Toyohashi; Tokio Kohama, Nishio, all of Japan

[73] Assignee: Nippondenso Co., Ltd., Kariya, Japan

[21] Appl. No.: 934,649

[22] PCT Filed: Apr. 27, 1992

[86] PCT No.: PCT/JP92/00553
§ 371 Date: Mar. 1, 1993
§ 102(e) Date: Mar. 1, 1993

[87] PCT Pub. No.: WO92/19853
PCT Pub. Date: Nov. 12, 1992

[30] Foreign Application Priority Data

May 8, 1991 [JP] Japan ................................. 3-102696

[51] Int. Cl.⁵ ........................ F02D 33/02; F02D 9/16
[52] U.S. Cl. ................................. 123/403; 123/405; 137/454.6; 137/883
[58] Field of Search .............. 123/52 MF, 337, 403, 123/405, 585; 137/454.6, 870, 883; 251/129.11, 309

[56] References Cited

U.S. PATENT DOCUMENTS

| | | | |
|---|---|---|---|
| 4,354,459 | 10/1982 | Maxey | 123/80 BA |
| 4,484,543 | 11/1984 | Maxey | 123/403 X |
| 4,738,233 | 4/1988 | Hitomi et al. | 123/403 X |
| 4,796,584 | 1/1989 | Goto et al. | 123/403 |
| 5,005,545 | 4/1991 | Wendel et al. | 123/337 |
| 5,080,065 | 1/1992 | Nomura et al. | 123/403 |

FOREIGN PATENT DOCUMENTS

| | | |
|---|---|---|
| 2456214 | 12/1980 | France . |
| 54-88929 | 6/1979 | Japan . |
| 56-113006 | 9/1981 | Japan . |
| 61-31146 | 9/1986 | Japan . |
| 63-65138 | 3/1988 | Japan . |
| 1267316 | 10/1989 | Japan . |
| 2140419 | 5/1990 | Japan . |
| 235090 | 9/1990 | Japan . |
| 2223634 | 9/1990 | Japan . |
| 41420 | 1/1992 | Japan . |
| 8302800 | 8/1983 | PCT Int'l Appl. . |

OTHER PUBLICATIONS

Patent Abstract of Japan, vol. 12, No. 014 (M-659) Jan. 16, 1988, JP-A-62 174 531, Jul. 1988.
Patent Abstract of Japan, vol. 12, No. 014 (M-659) Jan. 16, 1988, JP-A-62 174 513, Jul. 1987.

*Primary Examiner*—Tony M. Argenbright
*Attorney, Agent, or Firm*—Cushman, Darby & Cushman

[57] ABSTRACT

The present invention provides an intake control valve which is able to reduce intake air leakage, control the amount of intake air with high accuracy, and to allow easy installation to an intake manifold. The intake control valve of an intake control device according to the present invention has a valve body, a case, and an actuator. The valve body is rotatably installed in the case, opening and closing an openingclosing passage formed in the case. The case is fitted with the actuator, which functions to rotate the valve body. In the meantime, the intake manifold is provided for a mounting bore formed for insertion of the case. On the outer side of the case are installed sealing members, which contact the wall surface of the mounting bore to prevent air leakage. The intake control valve is installed in the mounting bore formed in the intake manifold after assembling the valve body, the case and the actuator into one unit.

41 Claims, 21 Drawing Sheets

SEAL THIS SURFACE

SEAL THIS SURFACE

SEAL THIS SURFACE

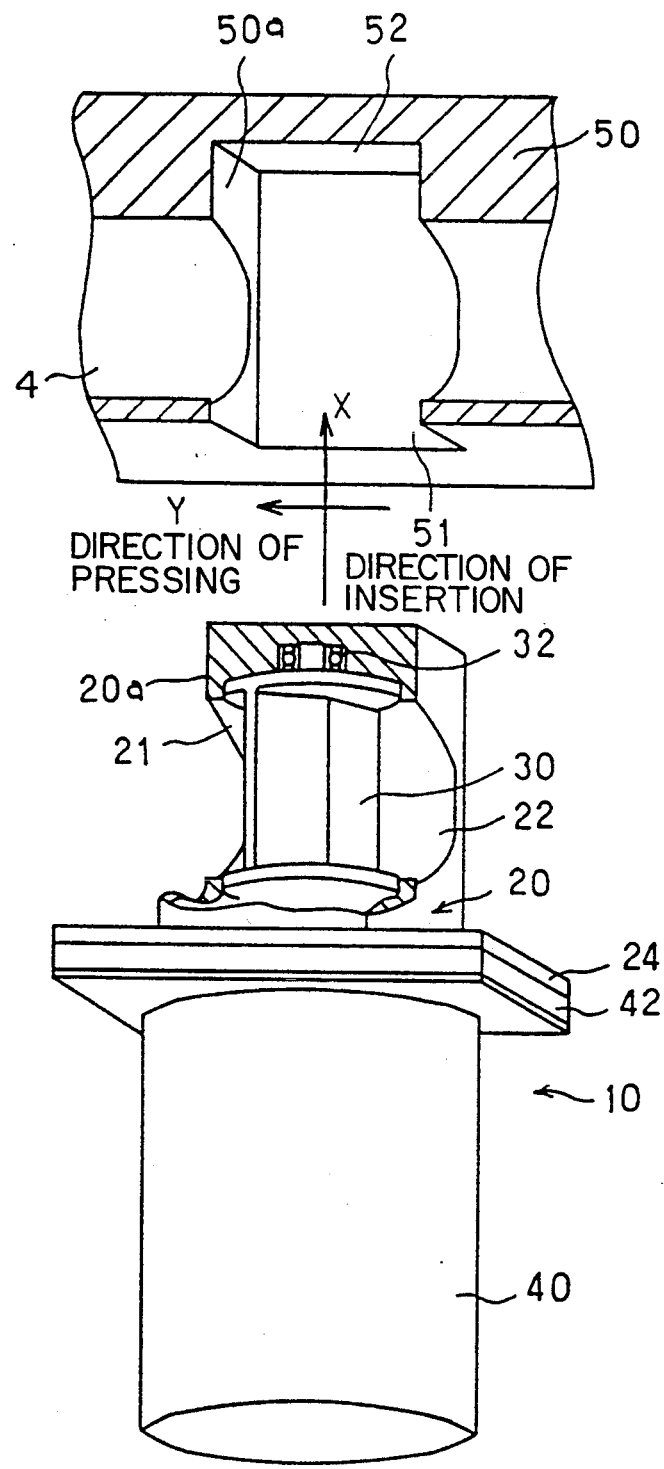

FIG. 31

| ENGINE SPEED | 800 | 1200 | 1600 | 5200 |
|---|---|---|---|---|
| VALVE-OPENING TIMING | -20 | 0 | 1 | 10 |

FIG. 32

| ENGINE SPEED | | 800 | 1200 | 1600 | 5200 |
|---|---|---|---|---|---|
| VALVE-CLOSE ADVANCE-ANGLE | PARTIAL LOAD LITTLE | 60 | 60 | 60 | 60 |
| | PARTIAL LOAD GREAT | 40 | 37 | 32 | 10 |
| | FULL-LOAD | 0 | 0 | -2 | -60 |

INTAKE CONTROL DEVICE OF INTERNAL COMBUSTION ENGINE

DESCRIPTION

1. Technical Field

The present invention relates to an intake control device of an internal combustion engine provided with an intake control valve in each intake passage communicating with each engine cylinder and an intake valve installed in a combustion chamber of the internal combustion engine and, more particularly, to the constitution of these intake control valves.

2. Background Art

In the internal combustion engine, there sometimes takes place a state of valve overlap in which an intake valve and an exhaust valve simultaneously open when the intake stroke starts. In such a case there occurs the back flow of burned gases from inside the cylinder and an exhaust passage into an intake passage, resulting in such a trouble as a lowered intake air charging efficiency and deteriorated fuel economy. To prevent this back flow of burned gases by means of an intake control valve, there has been proposed, as disclosed in for example Japanese Patent Laid-Open No. Sho 63-65138, a means to prevent the back flow by the intake control valve installed in each intake passage communicating with each engine cylinder and an intake valve is provided in the combustion chamber of the internal combustion engine. On the valve overlap when the intake and exhaust valves are simultaneously opened, each of these intake control valves is operated by an independent actuator to close the intake air passage, thereby checking the back flow of the burned gases to improve the intake air charging efficiency.

Since the quantity of intake air to be drawn into the combustion chamber of the internal combustion engine can be controlled by controlling an air intake period by the intake control valve simultaneously with the movement of an internal engine piston, it is possible to open the throttle valve wide to maintain a high intake passage pressure on the intake stroke. Therefore, air supply into the internal combustion engine during partial load operation can easily be performed, thereby reducing a pumping loss, realizing an increase in an internal engine torque and improving fuel economy.

However, the prior-art intake control valve disclosed in the aforementioned patent publication is of such a structure that a push rod is actuated by an actuator which includes a piezoelectric element disposed outside of the intake passage, to thereby operate a valve body which comprises a plurality of spring plate members installed in the intake passage, thus opening and closing the intake passage.

The aforesaid intake control valve has many component parts because the valve body thereof uses a number of plate members to open and close the intake passage and requires much time to install. In addition a clearance is likely to occur between each valve body and the intake passage, giving a considerable influence to the engine performance. To eliminate this clearance, it will become necessary to improve a valve body processing accuracy, which, however, will result in an increased cost.

Furthermore, the prior-art intake control device has the following disadvantage that the overall structure of the intake control valve including the actuator consisting of the piezoelectric element and others is likely to become large in size and further the surrounding structure of the intake passage becomes complicated, and also it has so excessive weight as to give a great effect to the weight of the vehicle body, thus increasing the fuel consumption of the internal combustion engine.

DISCLOSURE OF THE INVENTION

The present invention has been accomplished in an attempt to obviate the above-mentioned disadvantages and has as its object the provision of an intake control device of an internal combustion engine which is easy to handle and can easily be mounted in the intake air passage.

It is another object of the present invention to improve the clearance accuracy of the intake control device and to control intake operation with high accuracy by reducing air leakage.

It is further another object of the present invention to provide an intake control valve which is small in size and light in weight and can easily be installed in the intake air passage.

In an attempt to accomplish the above object, the present invention adopts the following constitution.

In the intake control device of an internal combustion engine having the intake control valve which is mounted in the intake air passage of the internal combustion engine and operated to open and close the intake air passage simultaneously with the rotation of the internal combustion engine, the present invention provides:

an intake manifold with the intake air passage formed therein and a mounting bore formed communicating with the upstream and downstream sides of the intake passage; and the intake control valve, which includes a case which is inserted in the mounting bore, has an inlet and an outlet communicating with the upstream and downstream sides respectively of the intake air passage in the mounting bore, and has an opening-closing passage connected to the inlet and outlet, a valve body which is rotatably mounted in this case to open and close the opening-closing passage, a driving means which drives to rotate the valve body.

Also the present invention provides an intake control device of internal combustion engine comprising:

an intake manifold which is connected to the internal combustion engine and has the intake air passage through which the intake air passes into the internal combustion engine;

a throttle valve installed on the upstream side of the intake manifold and driven to open and close in accordance with a demand for controlling the speed of rotation of the internal combustion engine;

a mounting bore formed in the intake manifold and opening outwardly, communicating with the upstream and downstream sides of the intake air passage located at the downstream of the throttle valve;

a case inserted in the mounting bore, having an inlet and an outlet communicating with the upstream and downstream sides of the intake passage in the mounting bore, and having an opening-closing passage connecting the inlet and outlet to each other;

a valve body rotatably mounted in this case, and opening and closing the opening-closing passage; and a driving means connected to the case, and driving the valve body to change the amount of opening of the opening-closing passage simultaneously with the rotation of the internal combustion engine.

Also, in the intake control device of the internal combustion engine for controlling the quantity of intake air to be supplied to combustion chambers of the internal combustion engine simultaneously with the rotation of the engine, the present invention provides an intake control valve comprising:

a case having an inlet communicating with the upstream side of the intake air passage, an outlet communicating with the downstream side of the passage, and an opening-closing passage communicating with the inlet and outlet, and being inserted in the mounting bore formed in the passage;

a valve body rotating in the case to change the opening of the opening-closing passage; and a driving means installed to the case and connected to the valve body, and driving to rotate the valve body simultaneously with the rotation of the internal combustion engine.

According to the constitution of the brake control device of the present invention, the intake air passage is formed in the intake manifold, in which the mounting bore is formed. In the meantime, the intake control valve which is driven to open and close simultaneously with the rotation of the internal combustion engine includes the case, the valve body housed in this case, and the driving means for driving this valve body. In the case are formed the inlet and outlet communicating with the upstream and downstream sides of the intake air passage respectively, and further the opening-closing passage is formed to communicate with the inlet and outlet. The valve body is housed within the case so as to open and close the opening-closing passage in the case. The intake control valve is installed in the intake air passage by inserting this case in the mounting bore. With the operation of the valve body driven by the driving means, the opening-closing passage is opened and closed, thereby controlling the quantity of intake air flowing within this opening-closing passage. The brake control device of the present invention is so constituted that the case for holding the valve body is inserted in the mounting bore formed in the intake manifold, to thereby open and close the intake air passage. Therefore, the intake manifold of a simple constitution having only the mounting bore can be made. In addition since the intake control valve can be installed simply by inserting the case in the mounting bore, the handling, manufacture and assembly of the device can all be accomplished with ease.

Also, according to the constitution of the present invention, the intake control valve of the intake control device is mounted in the intake manifold downstream of the throttle valve; the amount of opening of the opening-closing passage is changed by driving the valve body simultaneously with the rotation of the internal combustion engine.

Furthermore, according to the present invention, the intake control valve of the intake control device is of such a constitution that the valve body, the case and the driving means make an assembly wherein the valve body is installed in the case, and the driving means is installed to the case; therefore the intake control valve can be connected to the intake air passage simply by inserting this case as an assembly into the mounting bore.

According to the present invention explained above, the intake control valve can be installed in the intake air passage merely by installing the valve body in the case and then by inserting the case in the mounting bore formed in the intake manifold, thereby enabling the provision of the intake control device having the intake control valve which assures the simplification of the constitution of the intake manifold, easy handling of the device, and easy mounting of the device in the intake air passage.

Furthermore, according to the present invention, it is possible to make high-accuracy control of the quantity of intake air by decreasing intake air leakage through high-accuracy control of a clearance between the valve body and the case.

Furthermore, the present invention can provide a small-sized, light-weight, easy-to-handle intake control device which is composed of the case, the valve body and the driving means all assembled into an assembly and therefore is easily mountable in the intake air passage.

BRIEF DESCRIPTION OF THE DRAWINGS

FIGS. 13(a) and 13(b) show a fourth embodiment of the present invention, in which FIG. 13(a) is a front view of the case and FIG. 13(b) is a side view of the case;

FIGS. 14(a) and 14(b) show a fifth embodiment of the present invention, in which FIG. 14(a) is a front view of the case and FIG. 14(b) is a side view of the case;

FIGS. 15(a) and 15(b) show a sixth embodiment of the present invention, in which FIG. 15(a) is a front view of the case and FIG. 15(b) is a side view of the case;

FIGS. 16(a) and 16(b) show a seventh embodiment of the present invention, in which FIG. 16(a) is a front view of the case and FIG. 16(b) is a side view of the case;

FIGS. 17(a) and 17(b) show an eighth embodiment of the present invention, in which FIG. 17(a) is a front view of the case and FIG. 17(b) is a side view of the case;

FIGS. 18(a) and 18(b) show a ninth embodiment of the present invention, in which FIG. 18(a) is a front view of the case and FIG. 18(b) is a side view of the case;

FIGS. 19(a) and 19(b) show a tenth embodiment of the present invention, in which FIG. 19(a) is a front view of the case and FIG. 19(b) is a side view of the case;

FIGS. 20(a) and 20(b) show a eleventh embodiment of the present invention, in which FIG. 20(a) is a front view of the case and FIG. 20(b) is a side view of the case;

FIG. 21 is an exploded perspective view showing a twelfth embodiment of the present invention, in which the intake control valve unit is mounted in the intake manifold;

FIGS. 31 and 32 are tables showing the valve opening timing and valve closing timing of the intake control valve of the first embodiment.

BEST MODE FOR CARRYING OUT THE INVENTION

Hereinafter the first embodiment of the brake control device of internal combustion engine according to the present invention will be explained with reference to the accompanying drawings 1 to 9.

Figure 9:
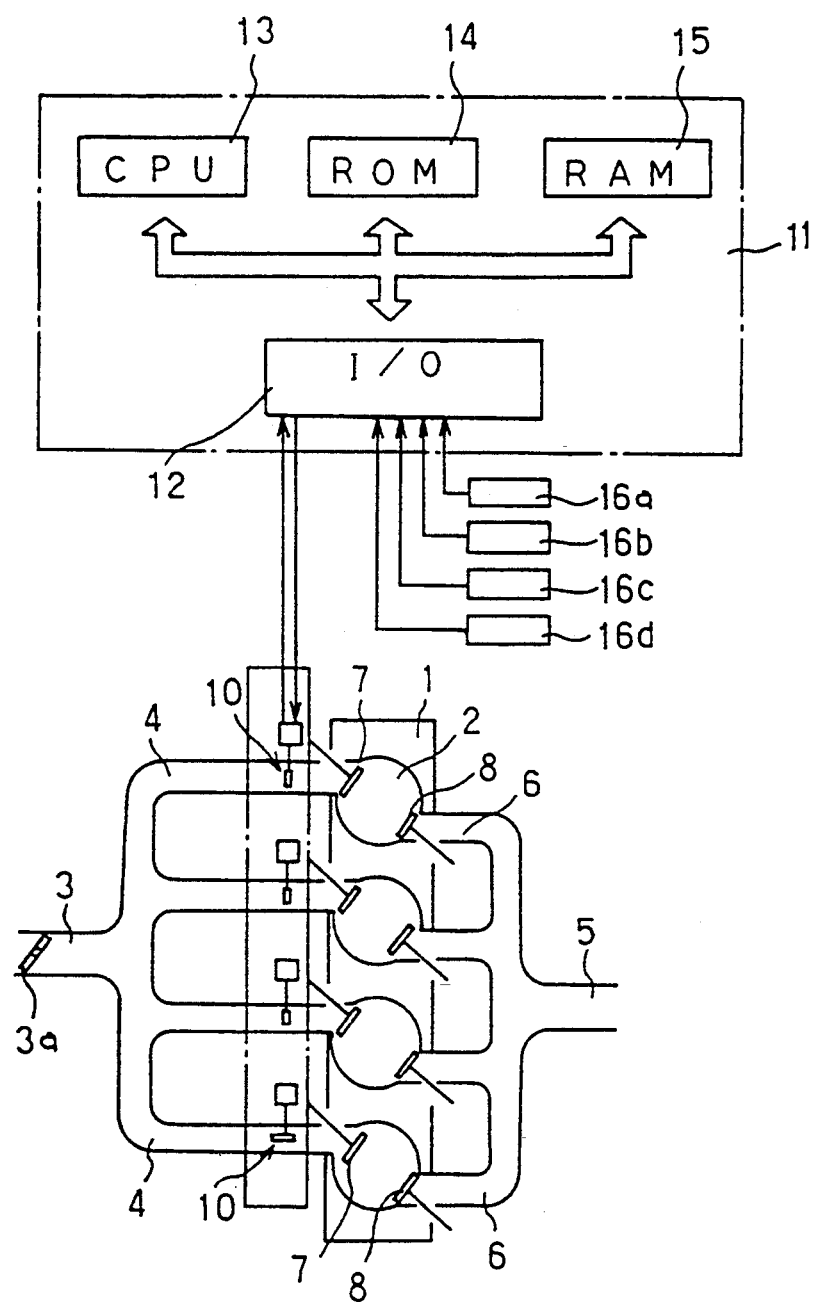
FIG. 9 is a block diagram showing the first embodiment of the intake control system in a four-cylinder engine.

FIG. 9 is a block diagram showing an intake control system of a four-cylinder engine 1. To each cylinder 2 of the engine 1 are connected an intake air passage 4 branched off from an intake manifold 3 and an exhaust passage 6 branched off from an exhaust manifold 5. In the intake manifold 3 is provided a throttle valve 3a which is opened and closed in accordance with the amount of operation of an accelerator pedal by a driver. There is set a specific operating characteristic between the amount of operation of the accelerator pedal and the amount of opening of the throttle valve 3a. The opening of the throttle valve 3a is controlled in accordance with this characteristic.

In the combustion chamber of each cylinder 2 are set an intake valve 7 which opens and closes the intake air passage 4 and an exhaust valve 8 which opens and closes the exhaust gas passage 6.

In each intake air passage 4 which is branched off from the intake manifold is installed an intake control valve 10.

The intake control valve 10 is operated to open and close independently of the opening and closing of the intake valve 7 in accordance with a signal of electric supply from the input-output section 12 of the control circuit 11. The control circuit 11 has a computer (CPU) 13, a read-only memory (ROM) 14 used for the storage of control programs, and a random-access memory (RAM) 15 used for the storage of control data, which are all built in the control circuit 11.

Connected to this control circuit 11 are a plurality of detectors 16. A crank angle sensor 16a is designed to produce a pulse signal when a piston (not illustrated) in each cylinder 2 is positioned at top dead center (TDC). A rotational speed sensor 16b produces a pulse signal at every specific crank angle. An intake air quantity detecting means 16c including a pressure sensor in the intake pipe functions to detect the quantity of intake air by each cylinder. Furthermore, a load detecting means 16d including a throttle opening sensor, an accelerator operating stroke sensor functions to detect the loaded condition of the engine.

The detection signal from each of the sensors 16a to 16d is inputted to the computer 13 through the input-output section 12 of the control circuit 11. This computer 13 controls the engine 1 through the input-output section 12 and at the same time gives off a control signal to the opening-closing driving means, that is, the actuator, of the intake control valve 10.

The intake control valve 10 is particularly shown in FIGS. 1 to 8, which will be explained below.

In the drawings, a numeral 20 refers to a case which will become the body of the intake control valve 10 manufactured, for example, of aluminum or aluminum alloy. This case 20 is of a cylindrical form with a closed top side, and has an inlet 21 and an outlet 22 in side walls which are open in opposite positions. Between the inlet 21 and the outlet 22 is formed an opening-closing passage 23 of the same size and same shape as the intake air passage 4. At the bottom of the case 20 a flange section 24 is formed and an inserting bore 25 communicating with the opening-closing passage 23 is open. In the top side of the case 20 is formed a bearing housing recess 26.

In the outside surface of the case 20 are provided packing fitting grooves of a square form when viewed from the inlet or outlet side, surrounding the inlet 21 and the outlet 22. Fitted in these grooves are ring-shaped rubber packings 27 and 28 round in section as sealing members.

Within this case 20 is rotatably installed a valve body 30, which is a cylindrical valve formed by adding an upper disk 35 and a lower disk 36 on and under a butterfly valve produced of aluminum or aluminum alloy, and coated with Teflon on the outside surface.

The valve body 30 is pressed over a pivot 31 inserted from the inserting bore 25 into the opening-closing passage 23, and is designed to rotate within the case 20 with the rotation of the pivot 31. With the rotation of the pivot 31 the valve body 30 is turned to each position shown in FIG. 8, thereby controlling the opening of the opening-closing passage 23. There is a very little clearance provided between the valve body 30 and the inner wall of the opening-closing passage 23, so that the valve body 30 rotates without contacting the opening-closing passage 23.

The pivot 31 is rotatably supported at the top end on a bearing 32, which is fitted in the aforesaid bearing housing recess 26 formed in the top side of the case 20. The lower end of this pivot 31 extends into an opening-closing driving means, that is, an actuator 40, and is driven to turn by this actuator 40.

Figure 7:
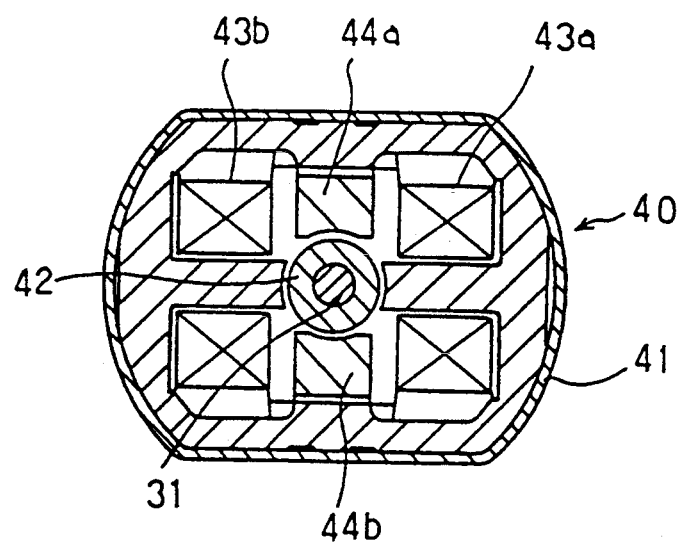
FIG. 7 is a sectional view taken along line 7—7 of FIG. 3.

The actuator 40 has a flange 42 at the top end of the cylindrical housing 41; into the interior of this housing 41 the lower end of the pivot 31 extends. On the pivot 31 is installed a rotary magnet 42, which, as shown in FIG. 7, is a cylindrical type and located in the actuator housing 41. The rotary magnet 42 has been magnetized so that its magnetic poles will vary in circumferential symmetrical positions. On the inner wall of the actuator housing 41 are installed a pair of magnetic coils 43a and 43b and a pair of permanent magnets 44a and 44b. These magnetic coils 43a and 43b and the permanent magnets 44a and 44b are arranged in mutually rectangular positions to control the rotational position of the rotary magnet 42 in accordance with the amount of magnetic force of these magnets.

Figure 8:
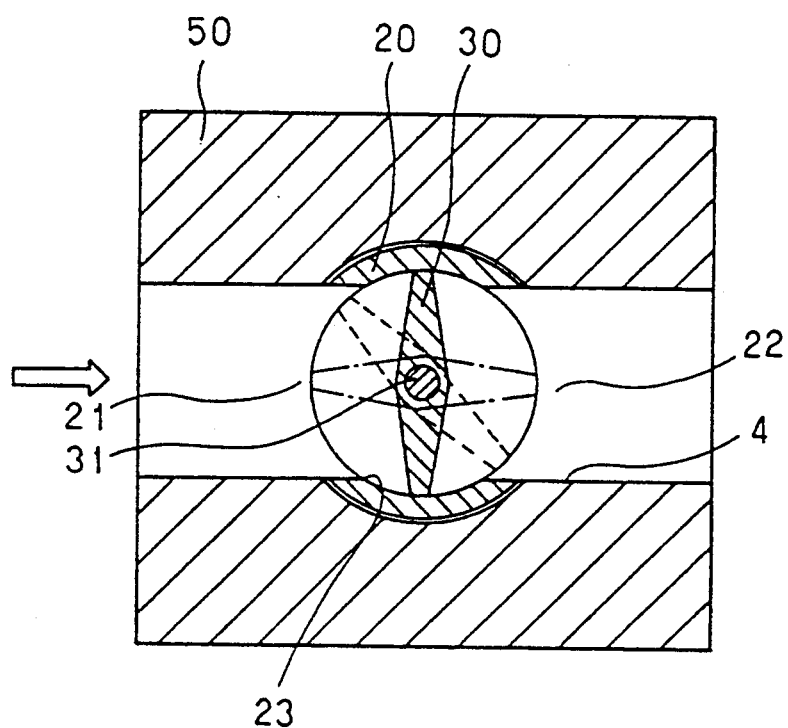
FIG. 8 is a sectional view taken along line 8—8 of FIG. 2.

That is, when the current is supplied to excite for example the magnetic coils 43a and 43b to the positive side, the rotary magnet 42 turns to a position determined by the magnetic pole formed by these magnetic coils 43a and 43b and the magnetic pole formed by the permanent magnets 44a and 44b, and accordingly the cylindrical valve body 30 turns to a full-open position indicated by an alternate long and short dash line in FIG. 8.

Also when the current is supplied to excite the magnetic coils 43a and 43b to the negative side, the rotary magnet 42 turns to a position determined by the magnetic pole formed by these magnetic coils 43a and 43b and the magnetic pole formed by the permanent magnets 44a and 44b, and accordingly the valve body 30 turns to a full-close position indicated by a full line in FIG. 9.

Furthermore, when the current supply to the magnetic coils 43a and 43b is interrupted, the rotary magnet 42 is turned by the magnetic pole formed by only the permanent magnets 44a and 44b, thus turning the valve body 30 to a half-open position indicated by a broken like in FIG. 8. In this half-open position, an air flow path is provided between the valve body 30 and the inner surface of the opening-closing passage 23.

To the cylindrical housing 41 of the actuator 40 is connected the case 20, and the valve body 30 and the actuator 40 are integrally installed also to the case 20, thereby unitizing the intake control valve 10.

Figure 1:
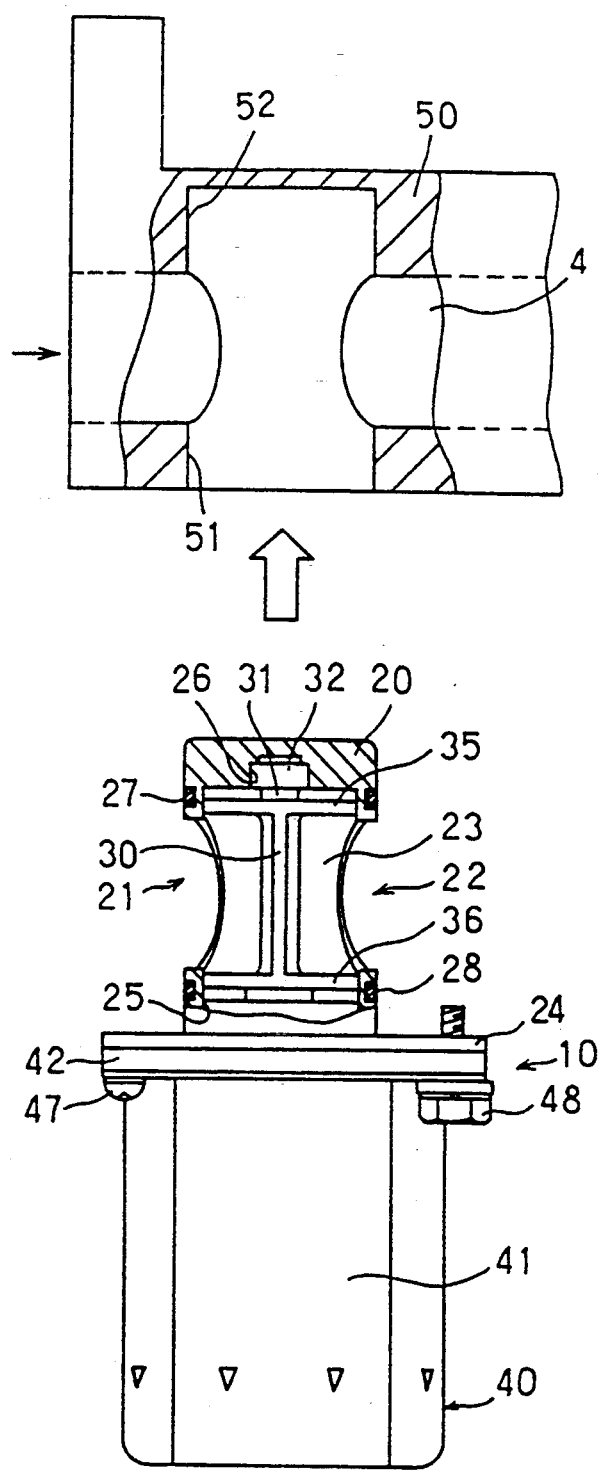
FIG. 1 is an exploded sectional view showing a first embodiment of the present invention in which an intake control valve unit is mounted in an intake manifold.
Figure 2:
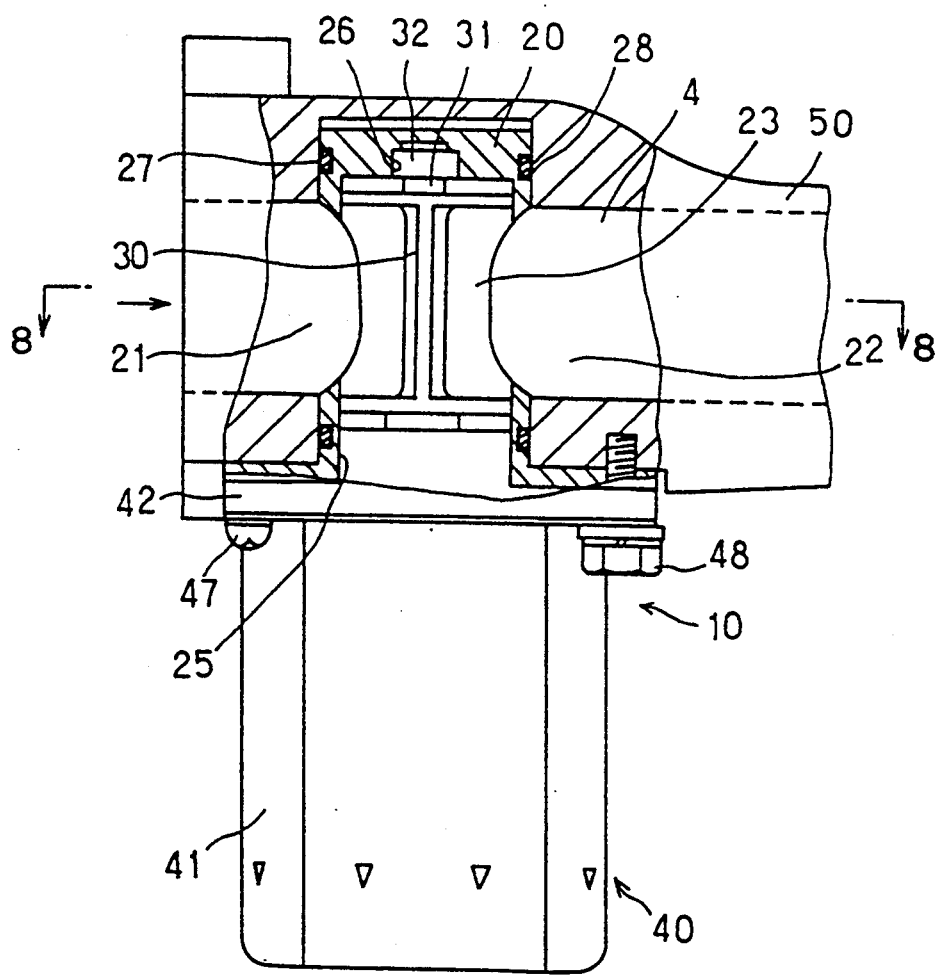
FIG. 2 is a sectional view showing the state of the first embodiment of the intake control unit mounted in the intake manifold.
Figure 3:
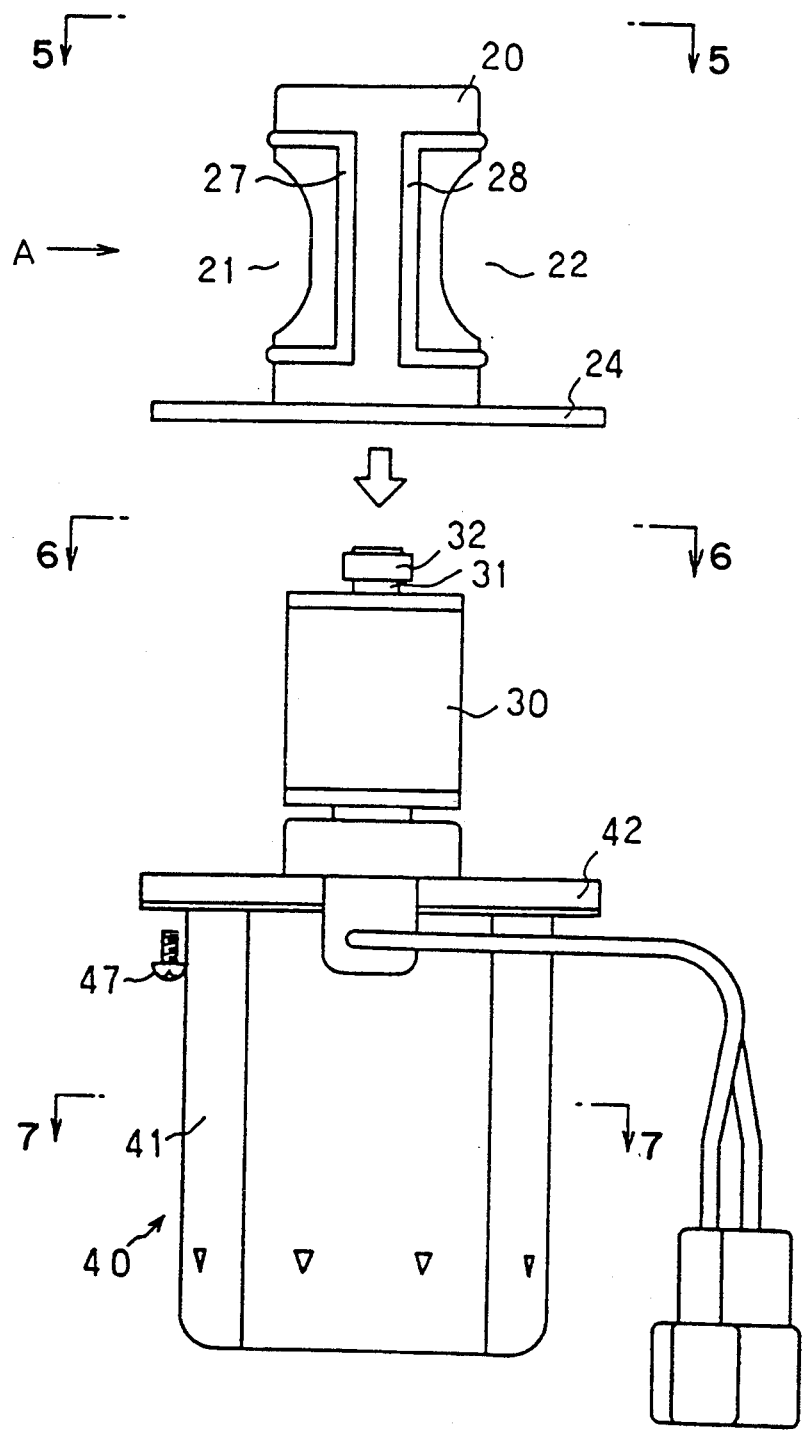
FIG. 3 is a side view showing the first embodiment of the intake control valve unit exploded into a case and an actuator.
Figure 4:
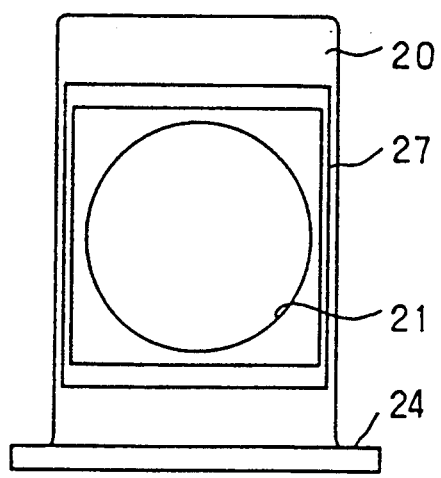
FIG. 4 is a front view of the case taken in the direction of the arrow A of FIG. 3.
Figure 5:
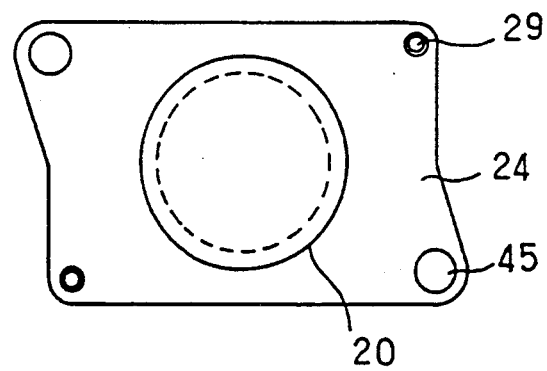
FIG. 5 is a plan view of the case taken along line 5—5 of FIG. 3.
Figure 6:
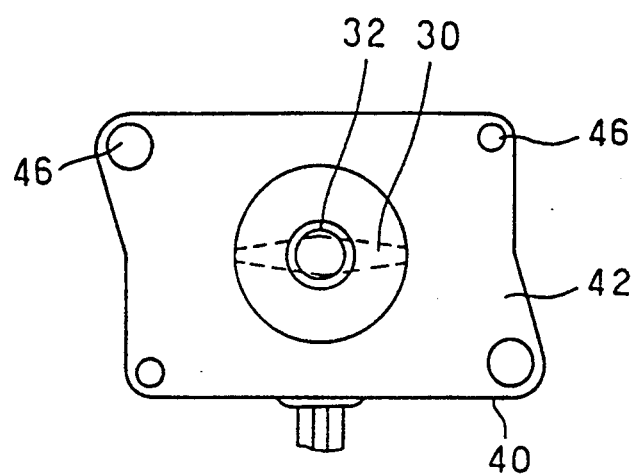
FIG. 6 is a plan view of the actuator taken along line 7—7 of FIG. 3.

On the flange section 24 of the case 20 are formed a pair of screw holes 29 on a diagonal line and a pair of through-holes 45 on the other diagonal line as shown in FIG. 5. In the flange section 42 formed in the cylindrical housing 41 of the actuator 40 are formed through-holes 46 in four corners as shown in FIG. 6. These flange sections 24 and 42 are connected to each other by inserting small screws 47 (see FIG. 1 or 3) from the flange section 42 side of the housing 41 into the pair of through-holes 46 located at diagonal positions, and then tightening them into the pair of screw holes 29 formed in the flange section 24 of the case 20. In the remaining through-hole 46 provided in the flange section 42 of the housing 41 and in the through-hole 46 in the flange section 24 of the case 20 are inserted bolts 48 from the flange section 42 side of the housing 41 as explained later on. The intake control valve 10 is mounted to the intake air passage 4 by the bolts 48.

The intake control valve 10 is utilized by connecting these flange sections 24 and 42. This unitized intake control valve 10 is installed to the intake air passage 4 communicating with the cylinder 2 of the engine 1.

The intake air passage 4 in which the intake control valve 10 is inserted is formed in an intake manifold 50 produced for example of aluminum or aluminum alloy. In the side wall of this intake manifold 50 is a mounting bore 51 for mounting the intake control valve 10. In the inner surface of the intake air passage 4 opposite to this mounting bore 51 is formed a fitting recess section 52 in which the top section of the case 20 of the intake control valve 10 fits.

The case 20 of the intake control valve 10 is inserted into the intake manifold 50 through the mounting bore 51, and the top section of the case 20 is fitted into the fitting recess 52. Then, the inlet 21 formed in the case 20 is directed to the upstream side of the intake air passage 4, while the outlet 22 placed oppositely to the downstream side; in this state the intake control valve 10 is fastened by bolts 48 to the intake manifold 50.

In this case, the bolts 48 are screwed into screw holes in the intake manifold 50 after inserting through the pair of through-holes 46 and the through-holes 45 provided in the flange section 24 of the case 20 from below the flange section 42 of the actuator 40, thus installing the intake control valve 10 to the intake manifold 50.

In the mounted state of the intake control valve 10, the rubber packings 27 and 28 installed in the outer side surfaces of the case 20, surrounding the inlet 21 and the outlet 22, are pressed in contact with the intake manifold 50 to thereby keep airtightness between the intake manifold 50 and the intake control valve 10.

Next, the function of the present embodiment of the above-described constitution will be explained.

The intake control valve 10 is driven simultaneously with the rotation of the internal combustion engine to control the quantity of intake air to be supplied to the combustion chamber of the internal combustion engine by each cylinder and by each intake stroke.

In the present embodiment, the valve opening timing and the valve closing timing of each intake control valve are separately set to control the opening and closing of each intake control valve.

First, the valve opening timing TO of the intake control valve is determined in accordance with FIG. 31. This valve opening timing TO is indicated in terms of the advance angle to top dead center on the intake stroke.

Subsequently the valve closing timing TC of the intake control valve is determined by the equation given below. The valve closing timing TC is indicated in terms of the advance angle to bottom dead center (BDC) on the intake stroke.

$$TC = TCBSE + TTC + FTC + TRTC + BTC + NTC + NETC + TDC$$

where TC is the valve closing timing; TCBSE is the amount of basic valve closing advance angle, which are obtained from FIG. 32; TTC is the mount of transient A/F compensating advance angle, or the amount of compensation for controlling the air-fuel ratio to a desired ratio at the time of transient change in the engine speed; FTC is the amount of combustion temperature compensating advance angle, which is set to control the combustion temperature to a desired value; TRTC is the amount of traction control compensating advance angle, which is set for respective high-accuracy control of the amount of air supply to the cylinders at the time of traction control for preventing a driving wheel slip during vehicle acceleration from standstill; BTC is the amount of intake air brake control compensating advance angle at the time of deceleration, which is set to improve the effect of engine brake during deceleration; NTC is the amount of compensating advance angle at the time when engine knocks are occurring, which is set to reduce the knocks when the knocks take place; NETC is the amount of air supply control compensating advance angle, which is set to control the amount of intake air by each cylinder to a specific value; and TDC is the amount of time variation compensating advance angle of the actuator, which is set to prevent controllability deterioration by a change in responsibility and a change in valve opening likely to be caused by the time variation of the actuator. The amount of basic valve closing advance angle TCBSE is set on the basis of an engine speed and a loaded condition of the engine in FIG. 32. The loaded condition of the engine is determined from the depth of depression of the accelerator pedal, etc. In FIG. 32, a partial load range within which the engine load is relatively little is divided to a large and a small range, and further a full-load condition is added, so that the amount of basic valve closing advance angle will be set by each speed in each of these three load ranges.

The valve opening timing TO and valve closing timing TC of each intake control valve are set as described above, and a valve driving current is supplied from the control device to the intake control valve in accordance with these valve opening timing TO and valve closing timing TC.

Therefore, each intake control valve is opened and closed simultaneously with the intake operation of each cylinder of the engine, and the intake timing and the amount of intake air supplied to each cylinder of the engine are controlled by the intake stroke of the cylinder.

In setting the valve opening timing also, a specific calculation formula is set similarly as the setting of the valve closing timing described above, and then the valve opening timing may be set on the basis of various amounts of compensation.

According to the intake control valve 10 of the present embodiment, the case 20, the valve body 30 and the actuator 40 are assembled in one unit, and therefore the intake control valve 10 becomes easy to handle; in particular, the intake control valve 10 can easily be installed in the intake air passage 4 simply by inserting the case 20 into the mounting bore 51 of the intake manifold 50.

Furthermore since the intake control valve 10 of the present embodiment thus unitized has the rotary valve body 30 for opening and closing the opening-closing passage 23 in the case 20 which is provided with the inlet 21 and the outlet 22, only one valve body is sufficient; besides since it is a rotary type, the intake control valve 10 is simple in construction with a decreased number of component parts, and the actuator 40 as an opening-closing driving means becomes of a simple construction.

In executing the intake control, the clearance of the intake control valve 10 which has an effect on intake air leakage is required to have a strictly high accuracy. However, the intake control valve 10 of the above-described constitution is of such a construction that the rotary valve body 30 is enclosed with the case 20, and therefore there can be kept a high-accuracy clearance between the case 20 and the valve body 30 simply by controlling the material, working accuracy and surface finish of these parts. Particularly, there is the effect that the intake control valve 10 will not be affected by the working accuracy of the intake manifold 50 which is a casting. In addition, the performance inspection and control of the intake control valve unit alone can be performed prior to the installation of the valve unit in the intake manifold 50, and because only a quality product is adopted, a greater yield than the valve of conventional constitution can be substantially improved.

When the valve body 30 is installed directly in the intake manifold 50 without using the case 20, there will be a wide clearance between the intake manifold and the valve body because the intake manifold produced of aluminum has a large casting variation which makes it difficult to perform inside surface machining and surface treatment; therefore if the aluminum valve body is coated with a Teflon resin, it is impossible to obtain a 50 $\mu$ or less clearance due to a large thermal change in the clearance resulting from a difference in the coefficient of thermal expansion between the aluminum and the Teflon resin.

On the other hand, as in the present embodiment, the thermal expansion characteristics of the valve body 30 and the case 30 can be approximated by mounting the intake control valve 10 of the unit construction that has the case 20 with the valve body 30 installed in the case 20, thus facilitating improving the working accuracy of the valve body 30 and the case 20 and the surface treatment such as surface coating and oxidation treatment and accordingly realizing the provision of an approximately 10 $\mu$m clearance.

Also, since the case is separate from the intake manifold 50, the inner surface of the case 20 and the opening-closing passage 23 can be mirror-finished, thereby further improving a clearance accuracy and preventing attachment of deposits.

Furthermore, the unitized intake control valve 10 can not only diminish a separate clearance but, in the state that the intake control valve 10 is installed in the intake manifold 50, the rubber packings 27 and 28 surrounding the inlet 21 and the outlet 22 are being pressed against the intake manifold 50 and therefore there is maintained a high-accuracy airtightness between the intake manifold 50 and the intake control valve 10 unit, thence giving no adverse effect to the clearance between the intake manifold 50 and the intake control valve 10.

In this case, since the rubber packings are employed, machining a bore in the intake manifold 50 requires no high accuracy and therefore the intake manifold 50 is applicable to various types of engines.

Furthermore, the coefficient of thermal expansion of the case 20 can easily be matched to that of the intake manifold 50, thus effectively reducing the clearance.

According to the constitution of the brake control device of the present embodiment, intake air leakage can be decreased by improving the accuracy of the case-to-intake manifold clearance and further by installing the rubber packings between the case and the intake manifold; therefore high-accuracy control can be effected when fine intake air control is required particularly during partial load operation and low-speed operation.

Since the intake control valve 10 of the above-described constitution is of such a construction that the rotary valve body 30 is enclosed with the case 20 and the actuator 40 is connected thereto, it is possible to realize a small-size, light-weight valve of simple construction.

In the case of the present embodiment, the use of a small-sized case 20 with the valve body 30 covered in one unit is usable, and its thermal capacity can be reduced to a less value as compared with the intake manifold. Therefore the thermal capacity of the case 20 can be made approximately equal to the thermal capacity of the valve body 30. Also since the case 20 is in contact with the intake air similarly to the valve body 30, heat dissipation to the case 20 and the valve body 30 can be made nearly equal. Furthermore the thermal capacities of the case 20 and the valve body 30 can be made nearly equal and a time difference of thermal deformation and change of the case 20 and the valve body 30 can be minimized. Consequently, the case 20 and the valve body 30 are subjected to shrinkage and expansion at an approximately same rate at the time of a sudden change in intake temperature, and accordingly a large change in a clearance between the both parts can be prevented. Particularly the internal combustion engine sometimes uses an exhaust gas recirculation (EGR) system to reduce NOx in exhaust gases. When the EGR is used, hot exhaust gases flow into the intake control valve 10; according to the above-described constitution, it is possible to prevent the occurrence of a heat trouble caused by the inflow of the hot gases from the EGR.

Next, the second embodiment of the present invention will be explained by referring to FIGS. 10 and 11.

Figure 10:
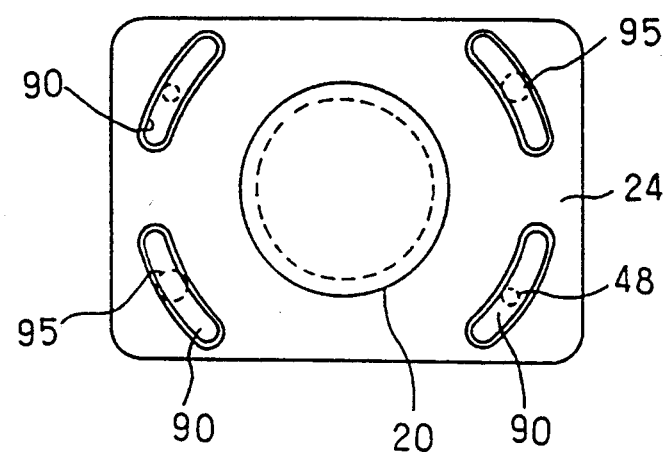
FIG. 10 is a plan view of a second embodiment of the case according to the present invention.
Figure 11:
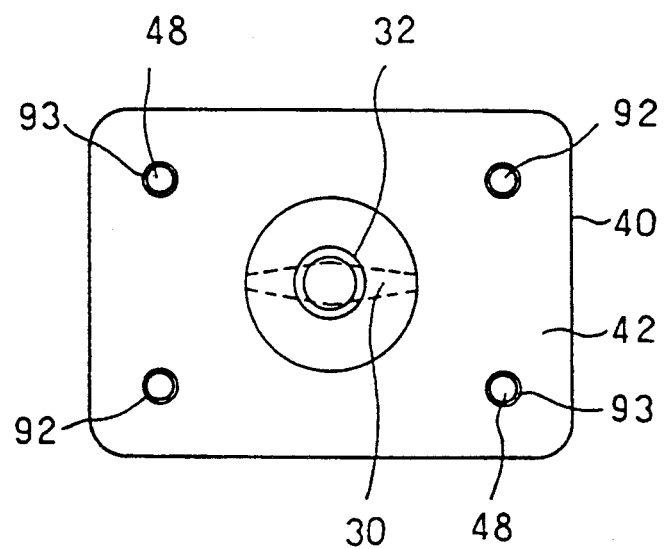
FIG. 11 is a plan view of the second embodiment of the actuator.

In the second embodiment, the case 20 has long circular holes 90 in four corners of the flange section 24 as shown in FIG. 10. On the other hand, the actuator 40 has a pair of screw holes 92 and a pair of through-holes 93 in diagonal positions in the flange section 42 formed in the cylindrical housing 41 as shown in FIG. 11. These flange sections 24 and 42 are connected to each other by inserting countersunk head screws 95 into the pair of long holes 90 provided in diagonal positions, from the flange section 24 side of the case 20, and then by screwing these countersunk head screws 95 into the screw holes 92 formed in the flange section 42 of the housing 41. In this case, the countersunk head screws 95 are installed with their heads below the top surface of the flange section 24 of the case 20. Subsequently the bolts 48 are inserted into the pair of through-holes 93 from below the flange section 42 of the actuator 40, and also into the long holes provided in the flange section 24 of the case 20, and then are screwed into the screw holes in the intake manifold 50, thus mounting the intake control valve 10 to the intake manifold 50.

In the case of the second embodiment, the case 20 of the intake control valve 10, being attached to the actuator 40 by the use of the countersunk head screws 95 inserted in the long holes 90, is rotatable with respect to the actuator 40; the case 20 and the valve body 30, therefore, make relative rotation to adjust their positions. These positions can be fine-adjusted if the valve body 30 fails to properly operate in the full-open and full-close positions because of an unbalanced magnetic force of the actuator 40.

Since the case 20 is attached in the intake manifold 50 by the bolts 49 inserted in a remaining pair of long holes 90 provided in the flange section 24, it is possible to adjust the position of the case 20 relative to the intake manifold 50 by turning the case 20, and also to make the high-accuracy positional adjustment with the inlet 21 and the outlet 22 directed to the upstream and downstream sides of the intake passage 4.

Next, the third embodiment of the present invention will be explained by referring to FIG. 12.

Figure 12:
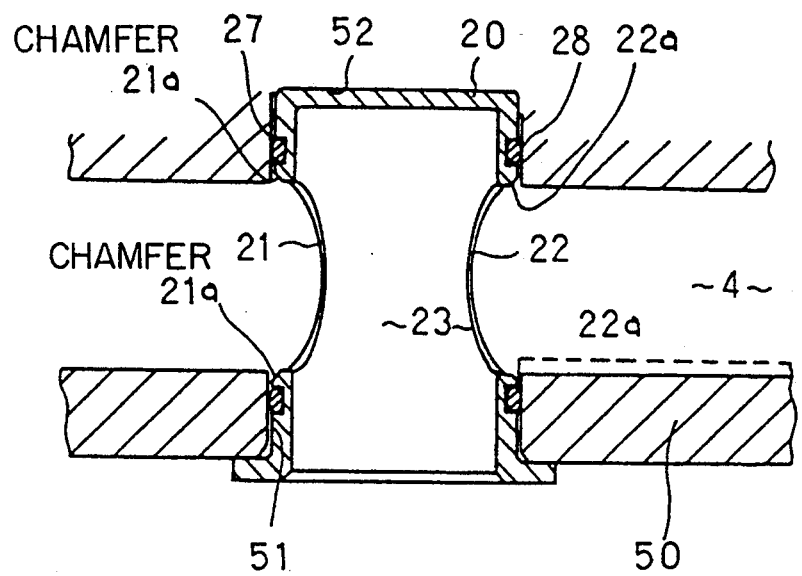
FIG. 12 is a sectional view showing a third embodiment of the present invention, in which the case is installed to the intake manifold.

In the third embodiment, the inlet 21 and the outlet 22 of the case 20 are provided with chambers 21a and 22a at their opening as shown in FIG. 12. When mounting the unit of the intake control valve 10 in the intake manifold 50, there sometimes occurs a positional misalignment, and accordingly a step, as indicated by a broken line in FIG. 12 between the intake air passage 4 and the inlet 21 and outlet 22 of the case 20 because of the presence of forming variation of the intake air passage 4 and working variation of the fitting recess 52. In the case of such a mounting condition, the surface of the intake air passage suddenly changes, giving an adverse effect to the intake characteristics. However, the sudden change in the surface area of the intake air passage due to the presence of the step can be prevented by providing the chambers 21a and 22a on the opening of either of the inlet 21 and the outlet 22.

Next, the fourth to fourteenth embodiments showing variations of constitution of the brake control device for keeping airtightness between the case and the intake manifold will be explained.

In the first embodiment, the sealing members comprising the rubber packings 27 and 28 are used in the outer surface of the case 20 for the purpose of keeping airtightness between the case 20 and the intake manifold 50; these rubber packings can be effected in various embodiments shown in FIGS. 13 to 20. That is, in FIGS. 13(a) to 20(a), the view is a front view of the case 20 as viewed from the inlet side, while in FIGS. 13(b) to 20(b) the view is a side view of the case 20. A reference numeral 60 in these drawings refers to a sealing member comprising a rubber packing.

Figure 13A:
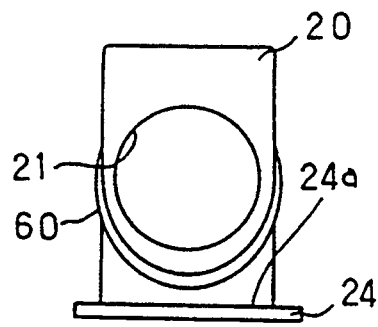
Figure 13B:
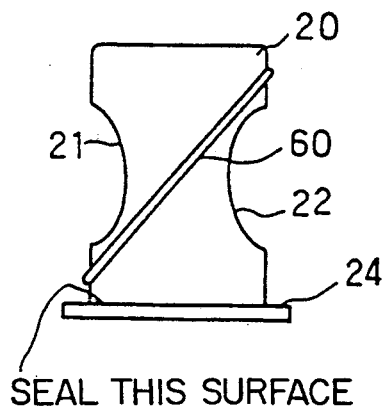
Figure 14A:
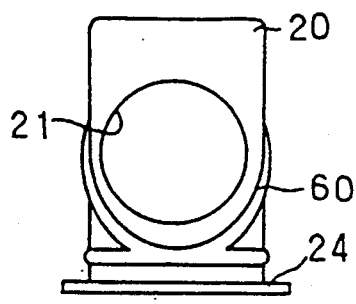
Figure 14B:
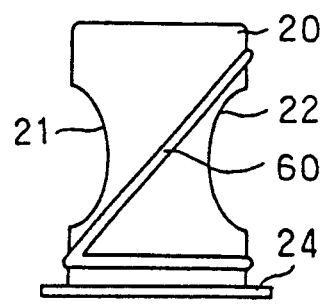
Figure 15A:
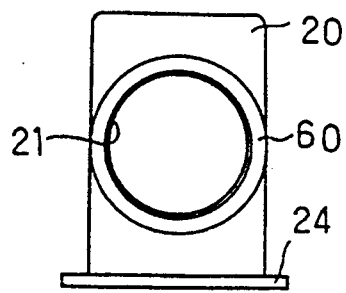
Figure 15B:
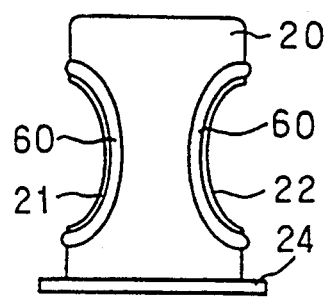
Figure 16A:
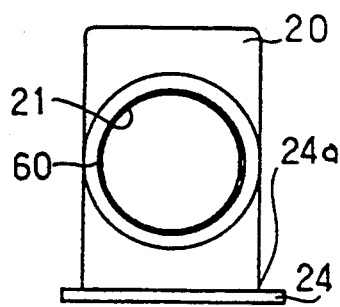
Figure 16B:
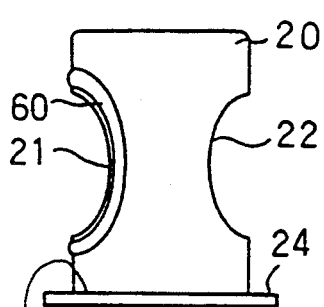
Figure 17A:
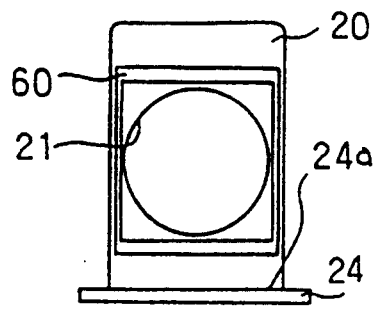
Figure 17B:
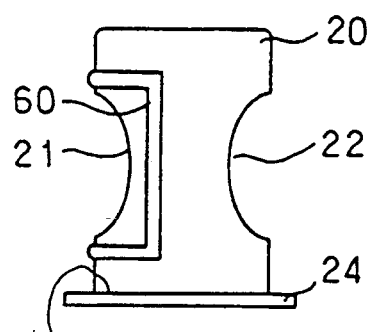
Figure 18A:
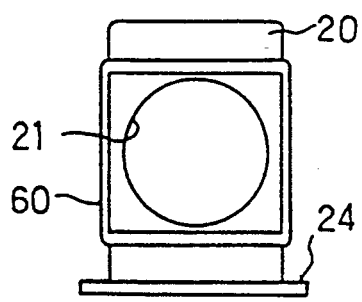
Figure 18B:
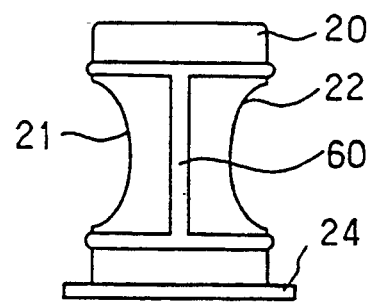
Figure 19A:
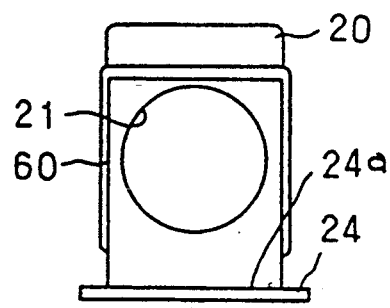
Figure 19B:
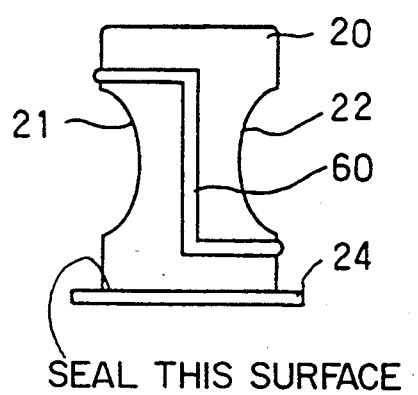
Figure 20A:
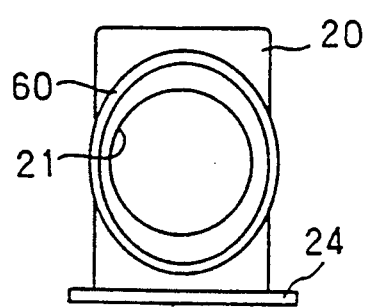
Figure 20B:
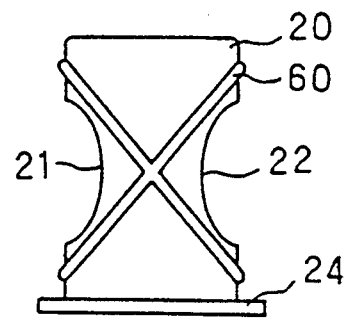

In the aforementioned embodiments shown in FIGS. 13(a) and (b), 16(a) and (b), 17(a) and (b), 18(a) and (b) and 19(a) and (b) there is a fear that there occurs a blow-by of the intake air through between the case 20 and the mounting bore 51 of the intake manifold 50; therefore it is desirable to seal (not illustrated) the upper surface 24a of the flange surface 24. It is imperative for this airtight structure to prevent the flow of the intake air into the internal combustion engine between the case and the intake manifold. Also, the sectional form of the rubber packing may have a projecting part for thereby assuring high airtightness.

Next, the twelfth embodiment of the present invention will be explained by referring to FIG. 21.

Figure 22:
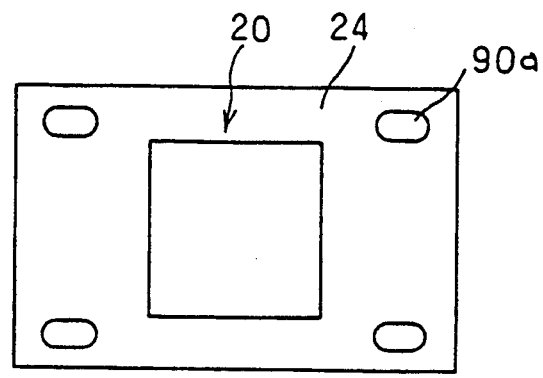
FIG. 22 is a plan view showing the case of the twelfth embodiment.

In the twelfth embodiment, airtightness is kept by parallelly moving the intake control valve 10 as shown in FIG. 21. In this embodiment, an inner surface 50a of the mounting bore of the intake manifold 50 is made in a form of rectangular flat surface; a contact surface 20a of the case 20 which is in contact with this inner surface 50a is also made in a form of rectangular flat surface. Furthermore, a long hole 90a in the flange section 24 of the case 20 is formed long in the direction of the upstream and downstream sides of the intake air passage 4 as shown in FIG. 22. After the case 20 unit of the intake control valve 10 is inserted in the mounting bore, the case 20 is moved in the direction of the arrow Y in FIG. 21 until the contact surface 20a of the case 20 is in close contact with the inner surface 50a of the mounting bore to securely install the intake control valve 10 to the intake manifold 50, thereby maintaining airtightness by holding the contact surface 20a in close contact with the inner surface 50a and the flange 24 in close contact with the intake manifold 50. The airtightness can be further improved by coating a liquid such as an adhesive or an oil over the contact surface.

Figure 23:
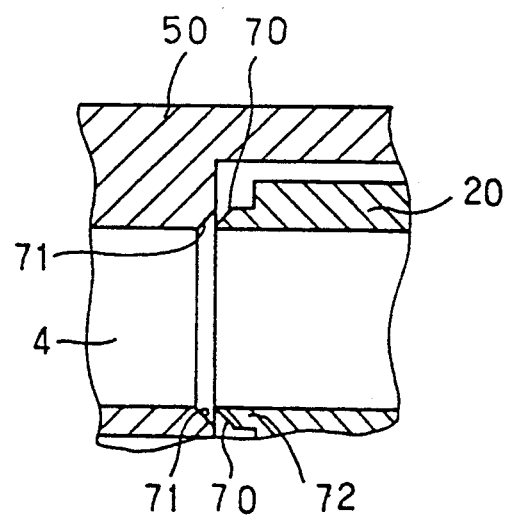
FIG. 23 is a partially sectional view showing a thirteenth embodiment of the present invention, in which the case is mounted in the intake manifold.

Subsequently, the thirteenth embodiment of the present invention will be explained by referring to FIG. 23.

In the present embodiment, the inner surfaces of the case 20 of the intake control valve 10 and the mounting bore of the intake manifold 50 are provided with chambers 70 and 71; and either one (the case 20 in the drawing) of the case 20 of the intake control valve 10 or the intake manifold 50 is provided with a projecting part 72. The projecting part 72 is pressed close to the chamfer 71, thereby closely contacting the chambers 70 and 71 with each other. This constitution, therefore, has such an advantage that a positional misalignment between the case 20 of the intake control valve 10 and the intake air passage 4 of the intake manifold 50 can be prevented.

Next, the fourteenth embodiment of the present invention will be explained by referring to FIG. 24.

Figure 24:
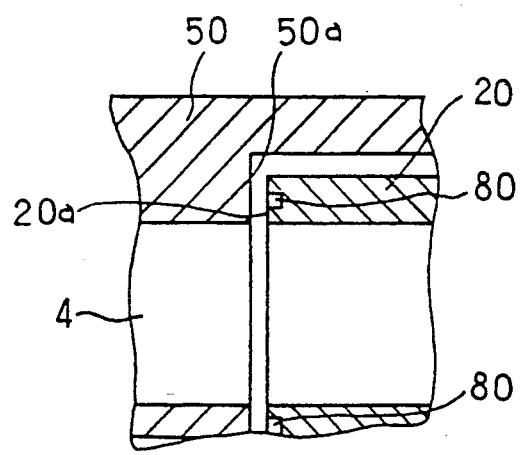
FIG. 24 is a partially sectional view showing a fourteenth embodiment of the present invention, in which the case is mounted in the intake manifold.

In the present embodiment, as shown in FIG. 24, a groove is made in either one of the contact surface 20a of the case 20 and the inner surface 50a of the intake manifold 50. In this groove is filled an adhesive 80, pressing these contact surfaces against each other.

Figure 25:
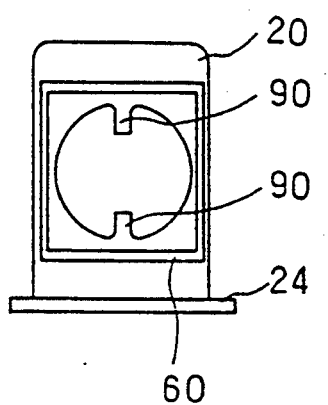
FIG. 25 is a front view of the case showing a fifteenth embodiment of the present invention.

Next, the fifteenth embodiment of the present invention will be explained by referring to FIG. 25.

In the present embodiment, the projecting part 90 is formed at the inlet 21 and the outlet 22 of the case 20 to insure positive heat dissipation to the case 20. The position and width of the projecting part 90 are so determined that it will overlap the valve body 30 when the valve body 30 is in a full-open position; the heat of the case 20 is dissipated to the intake air stream without increasing resistance in relation to the intake air stream.

Figure 26:
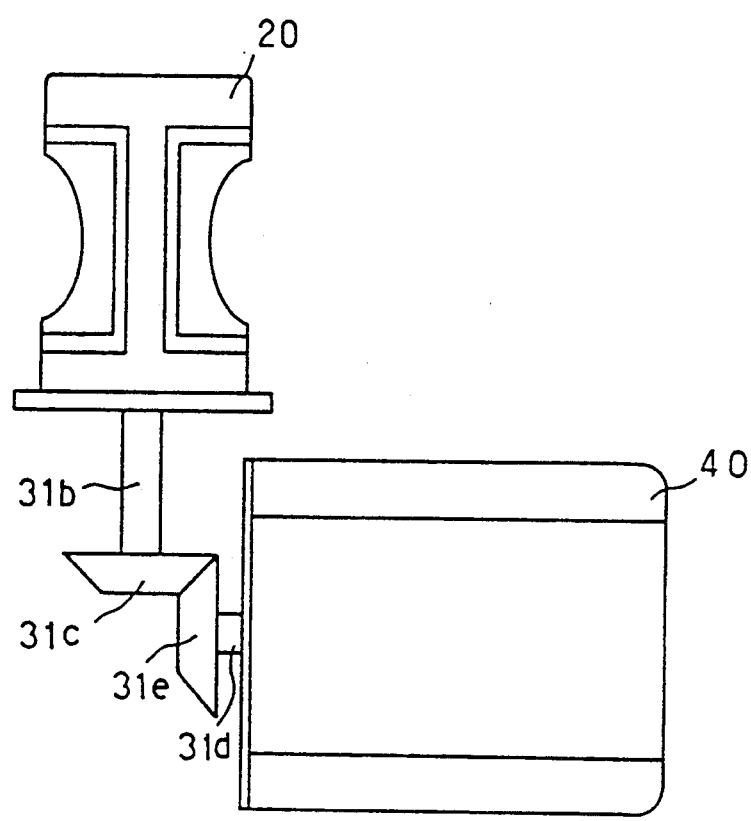
FIG. 26 is a front view showing the positional relationship of the case and the actuator according to a sixteenth embodiment of the present invention.

Next, the sixteenth embodiment of the present invention will be explained by referring to FIG. 26.

In the present embodiment, the case 20 and the actuator 40 are separately installed, and furthermore, with their axes intersecting at right angles, a power transmission mechanism is provided. On the end of the valve body support shaft 31b provided in the case 20 is mounted a helical gear 31c, and on the end 31d of the actuator 40 is mounted a helical gear 31e. With these helical gears in mesh with each other, the actuator 40 is connected to the valve body to drive the valve body. In this embodiment, the case 20 is mounted in the intake manifold, while the actuator 40 is secured to the engine by a stay not illustrated. According to this embodiment, since the case 20 installed at least to the intake manifold and the valve body housed in the case 30 and driven to rotate are unitized, it is possible to improve the accuracy of the intake control valve installed in the intake air passage, and further to decrease the clearance to reduce intake air leakage, thereby enabling high-accuracy intake quantity control.

Figure 27:
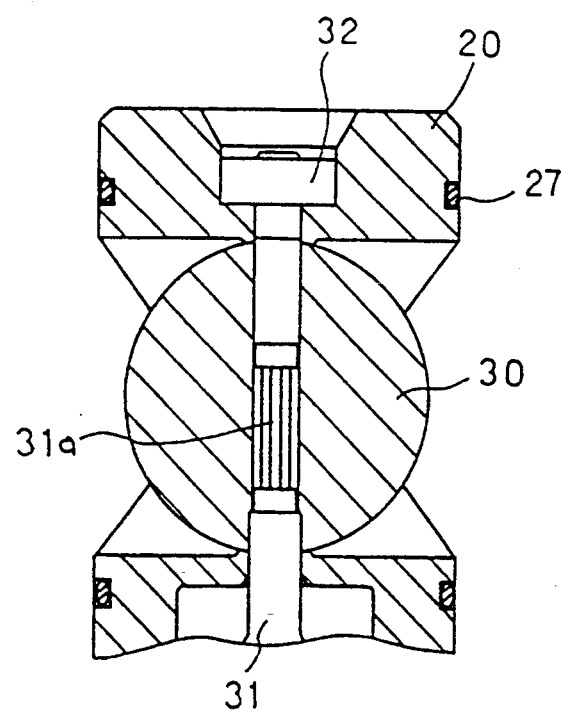
FIG. 27 is a partially sectional view showing the constitution of the case and the valve body according to a seventeenth embodiment of the present invention.

Next, the seventeenth embodiment of the present invention will be explained by referring to FIG. 27.

In each of the above-described embodiments, the cylindrical valve is used as the valve body 30, which, however, may be made in a form of cylindrical valve. In FIG. 27 a disk-like valve body 30 is housed in the case 20, and in this valve body 30 a support shaft is pressed. On the support shaft 31 is formed a knurled section 31a, by which the support shaft 31 is securely connected to the valve body 30. Also, at the center of the outer side of the case 20, a bearing 32 is pressed in. In this case, the clearance accuracy is lower than that of the cylindrical valve, but a necessary clearance accuracy is obtainable by installing a unitized valve body and case assembly.

Many embodiments of the present invention have been explained, but it is to be noted that various variations of the present invention may be adopted.

Also, the case 20 may be made in a rectangular or tapered configuration to insure easy installation to the intake manifold.

Furthermore, an adhesive of good heat conduction may be used at the mounting section for mounting the bearing 32 to improve heat conduction in the case the EGR is employed.

The sealing members of the case 20 and the intake manifold 50 may be other means than the rubber packings, such as adhesive, O-rings, liquid gasket, baking gaskets, etc. Also, there may be formed a plurality of grooves on both the case side and the manifold side to form labyrinth packings.

Furthermore, airtightness may be kept by such a construction that the case is formed of a resinous material, on the surface of which a projecting part is formed, and the projecting part is pressed into firm contact with the intake manifold.

Furthermore, a means for driving the actuator 40 is not limited only to the magnetically driving means using electromagnets and permanent magnets, but various other types of driving means such as pneumatic, oil hydraulic, electric and other driving means may be used.

Figure 28:
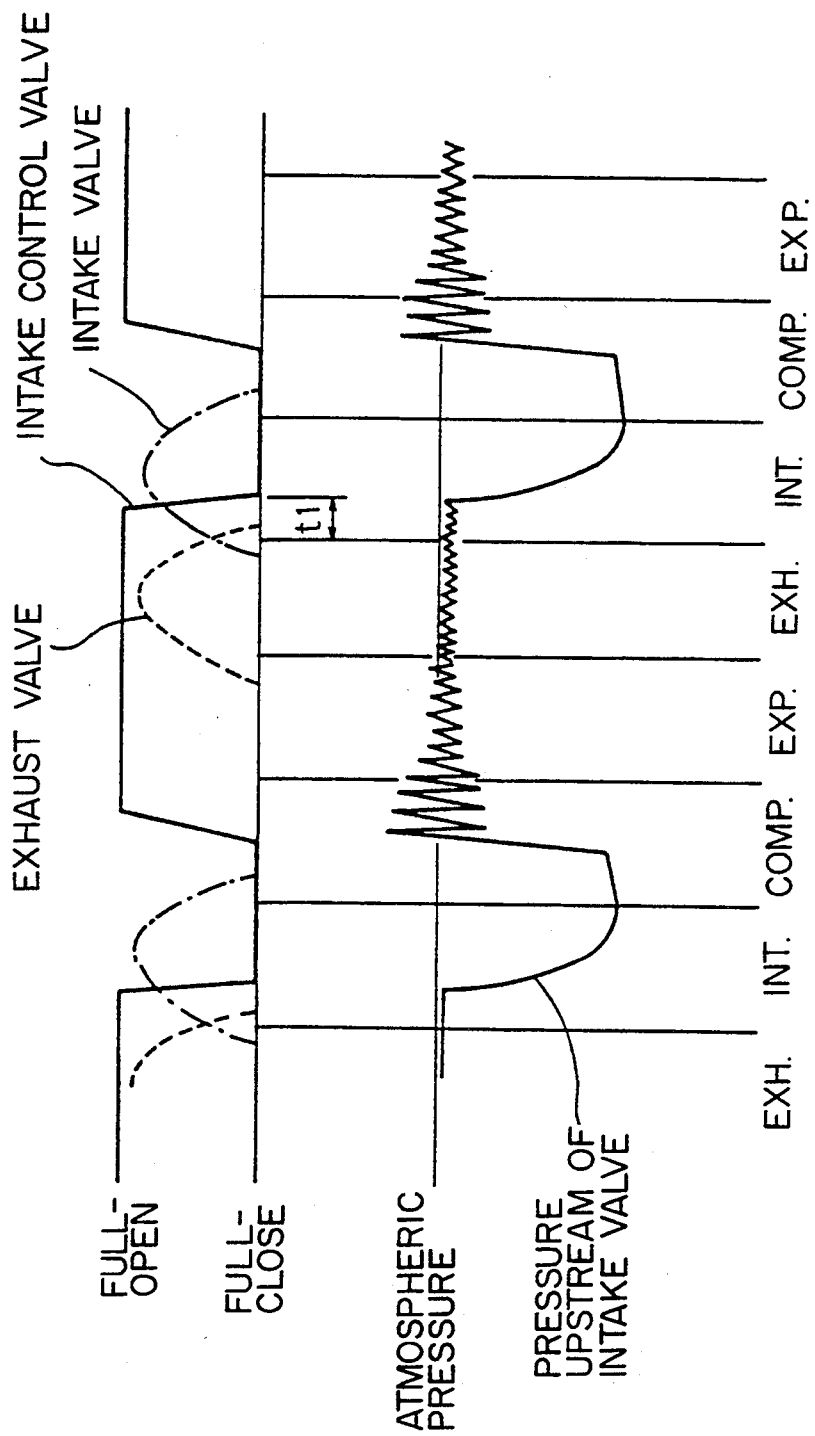
FIGS. 28, 29 and 30 are time charts explaining examples of operation of the intake control valve.
Figure 29:
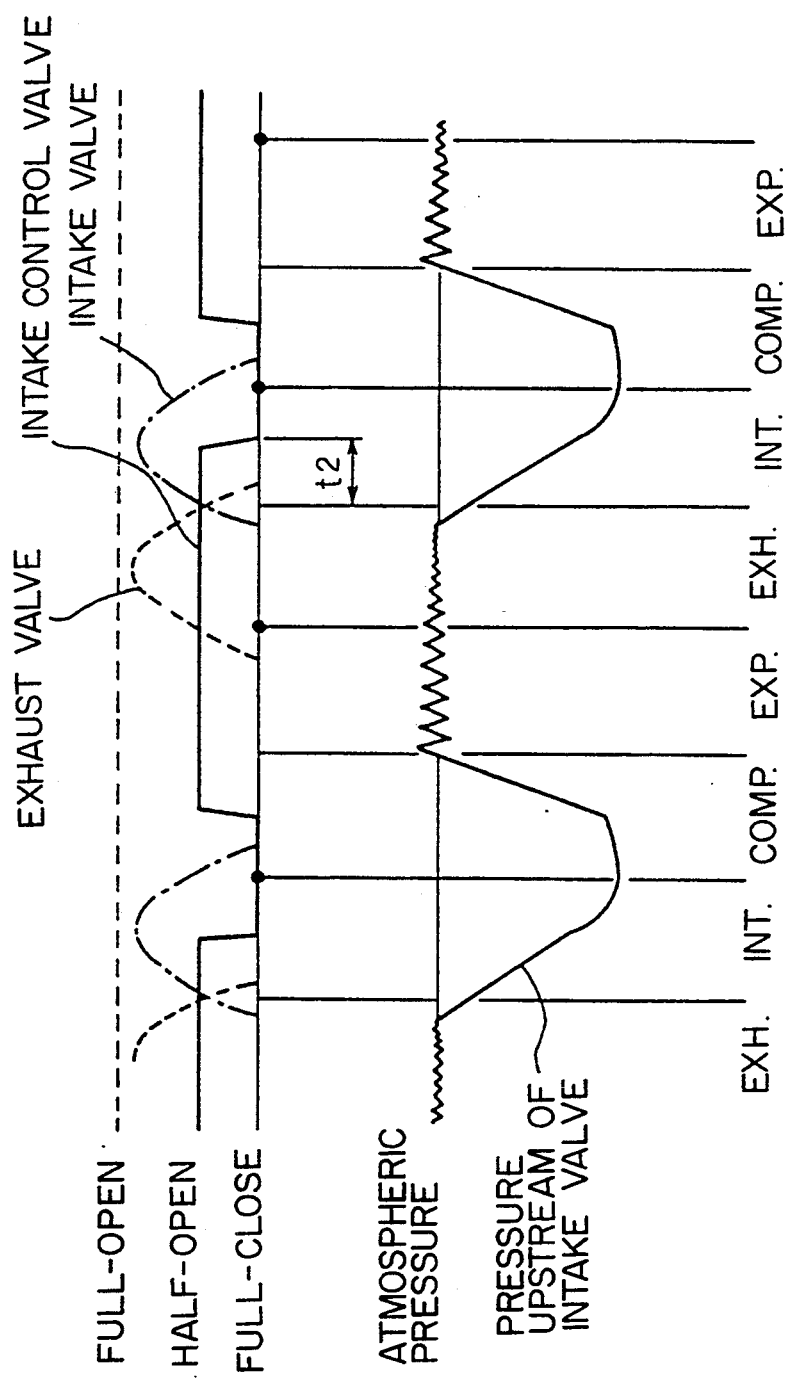

In the above-described embodiment, the intake control valve is driven between the full-open and full-close positions, but may be also between the full-close and intermediate opening positions (e.g., a half opening). For example, according to the actuator described in detail in the first embodiment, when the magnetic coils 43a and 43b are not energized, the rotary magnet 42 is held steady in a specific position by the permanent magnets 44a and 44b; however, the position of this rotary magnet 42 can be controlled to a desired position by controlling a magnetomotive force of the magnetic coil through duty control, at a specific frequency, of a driving voltage applied to the magnetic coil. The valve body 30 can be stopped in a half-open state by utilizing this function. Also it is possible to improve the intake air quantity control accuracy by driving the intake control valve between the full-close and half-close positions as compared with the intake control valve driven between the full-close and full-open positions. That is, when the intake control valve is driven between the full-close and full-open positions in an attempt to gain a specific amount of intake air, the intake control valve must be closed at the valve time ATDC t1 as illustrated in FIG. 28. However, when the intake control valve is operated between the full-close and half-open positions to obtain the specific amount of intake air, it is sufficient to drive the intake control valve at the timing ATDC t2 as illustrated in FIG. 29. Therefore, since the timing t2 is longer than the timing t1, it is possible to enhance the accuracy of control of the amount of intake air to be drawn into the engine while the intake control valve is open. Furthermore, since the intake control valve is held open for a long time, the period of adiabatic expansion during the intake stroke after the closing of the intake control valve can be decreased; therefore it is possible to prevent a combustion temperature drop likely to be caused by an air temperature drop caused by the adiabatic expansion while maintaining a pumping loss reduction effect. Also since the intake air flows into the cylinder for a prolonged period of time, an improvement in fuel combustion by the swirling motion of the air-fuel mixture can be expected.

FIGS. 28 and 29 are timing charts showing the operation of intake and exhaust valves operating correspondingly to engine operation cycles, an air pressure upstream of the intake valve, and the operation of the intake control valve.

Figure 30:
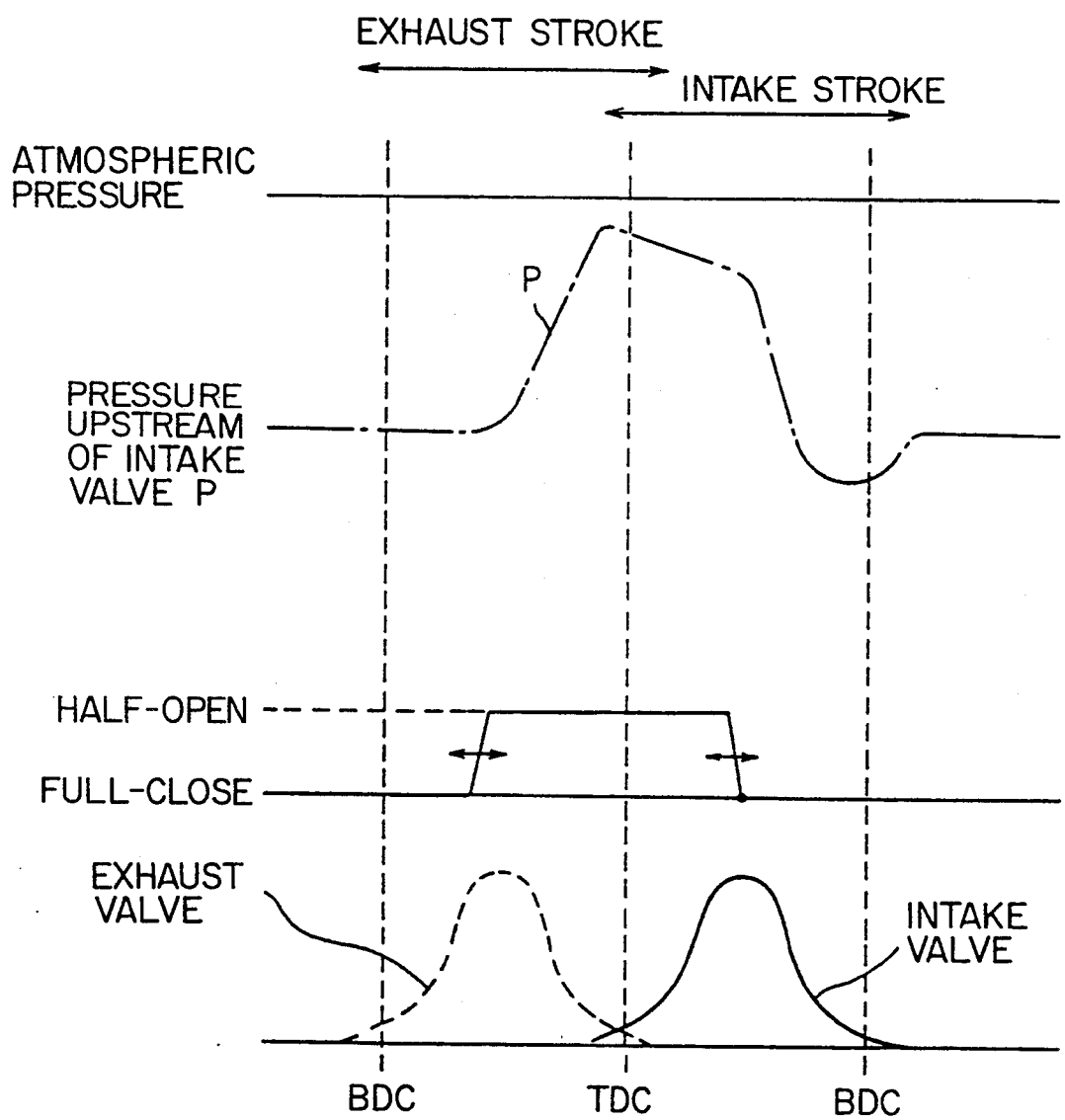

In FIGS. 28 and 29, the intake control valve opens at a timing largely advanced more than the intake valve opening timing; when the intake valve begins opening, the pressure upstream of the intake valve has risen nearly to and stabilized at the atmospheric pressure. Therefore, when the intake valve opens, the engine draws in the air at the atmospheric pressure. The amount of the intake air to be drawn into the engine can not be controlled below the amount of air to be determined by the volume of the intake air passage between the intake control valve and the intake valve and the atmospheric pressure. Therefore, a less amount of intake air may be realized by controlling the intake pressure upstream of the intake valve below the atmospheric pressure at the time of opening of the intake valve by retarding the intake control valve opening timing. For example, as shown in FIG. 30, it is possible to set the intake control valve opening timing to immediately before the intake control valve begins to open, so that the intake valve may begin to open before the intake pressure upstream of the intake valve reaches the atmospheric pressure. Thence it becomes possible to reduce the amount of the intake air to be supplied into the engine, and accordingly to perform a high-accuracy control of a small amount of intake air under a low-load condition, or under an idling condition.

The intake control device of the present invention can be used as a device mounted in the intake air passage of an internal combustion engine for controlling the intake period and the amount of intake air to be supplied into the cylinders of the engine; particularly the device can easily be mounted in the intake air passage, and facilitate its mounting to the internal combustion engine.

We claim:

1. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage, said intake control valve comprising:
   a case inserted in said mounting bore and having an inlet and an outlet communicating with said upstream and downstream sides of said intake air passage in said mounting bore and having an opening-closing passage connecting said inlet to said outlet;
   a valve body rotatably mounted in said case and opening and closing said opening-closing passage; and
   driving means for rotating said valve body,
   said intake control valve being driven in timed relation with the operation of an intake valve mounted at the inlet of a combustion chamber of said internal combustion engine, controlling, by each intake stroke, the amount of intake air being supplied into said combustion chamber of said internal combustion engine.

2. An intake control device of an internal combustion engine as claimed in claim 1, wherein an airtight means is provided between said case and said mounting bore to keep airtightness between said upstream and downstream sides of said intake air passage.

3. An intake control device of an internal combustion engine as claimed in claim 1, wherein said inlet and said outlet of said case are provided with chambers expanding toward said intake air passage.

4. An intake control device of an internal combustion engine as claimed in claim 1, wherein said opening-closing passage in said case is formed as a passage having a circular section communicating between said inlet and said outlet.

5. An intake control device of an internal combustion engine as claimed in claim 4, wherein said valve body is a disk valve inserted in said passage having the circular section.

6. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:
   a case inserted in said mounting bore and having an inlet and an outlet communicating with said upstream and downstream sides of said intake air passage in said mounting bore and having an opening-closing passage connecting said inlet to said outlet;
   a valve body rotatably mounted in said case and opening and closing said opening-closing passage; and
   driving means for rotating said valve body,
   said opening-closing passage in said case being of cylindrical form with said inlet and said outlet opening in a cylindrical surface,
   said valve body being a cylindrical valve inserted in said cylindrical opening-closing passage.

7. An intake control device of an internal combustion engine as claimed in claim 6, wherein an airtight means is provided between said case and said mounting bore to keep airtightness between said upstream and downstream sides of said intake air passage.

8. An intake control device of an internal combustion engine as claimed in claim 6, wherein said inlet and said outlet of said case are provided with chambers expanding toward said intake air passage.

9. An intake control device of an internal combustion engine as claimed in claim 6, wherein said opening-closing passage in said case is formed as a passage having a circular section communicating between said inlet and said outlet.

10. An intake control device of an internal combustion engine as claimed in claim 9, wherein said valve body is a disk valve inserted in said passage having the circular section.

11. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:
- a case inserted in said mounting bore and having an inlet and an outlet communicating with said upstream and downstream sides of said intake air passage in said mounting bore and having an opening-closing passage connecting said inlet to said outlet;
- a valve body rotatably mounted in said case and opening and closing said opening-closing passage;
- driving means for rotating said valve body; and
- connecting means for connecting said case to said intake air passage relatively movably within a specific range.

12. An intake control device of an internal combustion engine as claimed in claim 11, wherein said inlet and said outlet of said case are provided with chambers expanding toward said intake air passage.

13. An intake control device of an internal combustion engine as claimed in claim 11, wherein said opening-closing passage in said case is formed as a passage having a circular section communicating between said inlet and said outlet.

14. An intake control device of an internal combustion engine as claimed in claim 13, wherein said valve body is a disk valve inserted in said passage having the circular section.

15. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:
- a case inserted in said mounting bore and having an inlet and an outlet communicating with said upstream and downstream sides of said intake air passage in said mounting bore and having an opening-closing passage connecting said inlet to said outlet;
- a valve body rotatably mounted in said case and opening and closing said opening-closing passage;
- driving means for rotating said valve body, said driving means being mounted to said case, which will be inserted in said mounting bore after said case, said valve body and said driving means are assembled into one unit; and
- connecting means for connecting said case to said driving means relatively movably within a specific range of angle.

16. An intake control device of an internal combustion engine as claimed in claim 15, wherein said airtight means is provided between said case and said mounting bore to keep airtightness between said upstream and downstream sides of said intake air passage.

17. An intake control device of an internal combustion engine as claimed in claim 15, wherein said inlet and said outlet of said case are provided with chambers expanding toward said intake air passage.

18. An intake control device of an internal combustion engine as claimed in claim 15, wherein said opening-closing passage in said case is formed as a passage having a circular section communicating between said inlet and said outlet.

19. An intake control device of an internal combustion engine as claimed in claim 18, wherein said valve body is a disk valve inserted in said passage having the circular section.

20. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:
- a case inserted in said mounting bore and having an inlet and an outlet communicating with said upstream and downstream sides of said intake air passage in said mounting bore and having an opening-closing passage connecting said inlet to said outlet;
- a valve body rotatably mounted in said case and opening and closing said opening-closing passage; and
- driving means for rotating said valve body,
- said case being formed movably in a direction of said intake air passage within said mounting bore, and mounted in said intake air passage by connecting either one of said inlet side of said intake air passage communicating with said mounting bore to an inlet formed in said case and said outlet side of said intake air passage communicating with said mounting bore to an outlet formed in said case.

21. An intake control device of an internal combustion engine as claimed in claim 20, wherein said airtight means is provided between said case and said mounting bore to keep airtightness between said upstream and downstream sides of said intake air passage.

22. An intake control device of an internal combustion engine as claimed in claim 20, wherein said inlet and said outlet of said case are provided with chambers expanding toward said intake air passage.

23. An intake control device of an internal combustion engine as claimed in claim 20, wherein said opening-closing passage in said case is formed as a passage having a circular section communicating between said inlet and said outlet.

24. An intake control device of an internal combustion engine as claimed in claim 23, wherein said valve body is a disk valve inserted in said passage having the circular section.

25. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:
- a case inserted in said mounting bore and having an inlet and an outlet communicating with said upstream and downstream sides of said intake air passage in said mounting bore and having an opening-closing passage connecting said inlet to said outlet;

a valve body rotatably mounted in said case and opening and closing said opening-closing passage; and driving means for rotating said valve body, said inlet or outlet of said case being provided with a heat dissipating section for heat dissipation to an air stream flowing in said intake air passage.

26. An intake control device of an internal combustion engine as claimed in claim 25, wherein said airtight means is provided between said case and said mounting bore to keep airtightness between said upstream and downstream sides of said intake air passage.

27. An intake control device of an internal combustion engine as claimed in claim 25, wherein said inlet and said outlet of said case are provided with chambers expanding toward said intake air passage.

28. An intake control device of an internal combustion engine as claimed in claim 25, wherein said opening-closing passage in said case is formed as a passage having a circular section communicating between said inlet and said outlet.

29. An intake control device of an internal combustion engine as claimed in claim 28, wherein said valve body is a disk valve inserted in said passage having the circular section.

30. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:

a case inserted in said mounting bore and having an inlet and an outlet communicating with said upstream and downstream sides of said intake air passage in said mounting bore and having an opening-closing passage connecting said inlet to said outlet;

a valve body rotatably mounted in said case and opening and closing said opening-closing passage; driving means for rotating said valve body; and a power transmission mechanism for transmitting a driving power, between a support shaft for supporting said valve body and said driving means.

31. An intake control device of an internal combustion engine as claimed in claim 30, wherein said airtight means is provided between said case and said mounting bore to keep airtightness between said upstream and downstream sides of said intake air passage.

32. An intake control device of an internal combustion engine as claimed in claim 30, wherein said inlet and said outlet of said case are provided with chambers expanding toward said intake air passage.

33. An intake control device of an internal combustion engine as claimed in claim 30, wherein said opening-closing passage in said case is formed as a passage having a circular section communicating between said inlet and said outlet.

34. An intake control device of an internal combustion engine as claimed in claim 33, wherein said valve body is a disk valve inserted in said passage having the circular section.

35. An intake control device of an internal combustion engine including an intake control valve mounted in an intake air passage of said internal combustion engine and driven in timed relation with rotation of said internal combustion engine to open and close said intake air passage, and an intake manifold having said intake air passage formed inside and a mounting bore communicating with the upstream and downstream sides of said intake air passage; said intake control valve comprising:

a case inserted in said mounting bore and having an inlet and an outlet communicating with said upstream and downstream sides of said intake air passage in said mounting bore and having an opening-closing passage connecting said inlet to said outlet;

a valve body rotatably mounted in said case and opening and closing said opening-closing passage; and driving means for rotating said valve body, said driving means being an electric driving means for driving said valve body in accordance with an electric signal, maintaining said valve body partly opened when no current is supplied, and for driving said valve body in a fully opening and fully closing direction in accordance with the direction of current supply.

36. An intake control device of an internal combustion engine as claimed in claim 35, wherein said airtight means is provided between said case and said mounting bore to keep airtightness between said upstream and downstream sides of said intake air passage.

37. An intake control device of an internal combustion engine as claimed in claim 35, wherein said inlet and said outlet of said case are provided with chambers expanding toward said intake air passage.

38. An intake control device of an internal combustion engine as claimed in claim 35, wherein said opening-closing passage in said case is formed as a passage having a circular section communicating between said inlet and said outlet.

39. An intake control device of an internal combustion engine as claimed in claim 38, wherein said valve body is a disk valve inserted in said passage having the circular section.

40. An intake control device of an internal combustion engine, comprising:

an intake manifold connected to said internal combustion engine and having an intake air passage through which the intake air passes into said internal combustion engine;

a throttle valve mounted upstream of said intake manifold and driven to open and close in accordance with a demand for controlling the rotational speed of said internal combustion engine;

a mounting bore formed in said intake manifold and communicating with the upstream and downstream sides of said intake air passage located at the downstream of said throttle valve, opening outwardly;

a case inserted in said mounting bore, provided with an inlet and an outlet communicating with the upstream side and downstream side of said intake passage in said mounting bore, and having an opening-closing passage connecting said inlet to said outlet;

a valve body rotatably mounted in said case, for opening and closing said opening-closing passage; and driving means connected to said and driving said valve body in order to change the opening of said opening closing passage synchronously with the rotation of said internal combustion engine, said intake control valve being driven in timed relation with the operation of an intake valve mounted at the inlet of a combustion chamber of said internal combustion engine, controlling, by each intake stroke, the amount of intake air being supplied into said combustion chamber of said internal combustion engine.

41. An intake control valve used in an intake control device of an internal combustion engine for controlling the amount of intake air being supplied through an intake air passage into a combustion chamber of said internal combustion engine in timed relation with the rotation of said internal combustion engine, said intake control valve, comprising:

a case having an inlet communicating with the upstream side of said passage, an outlet communicating with the downstream side of said passage, and an opening-closing passage connecting said inlet to said outlet, and inserted in a mounting bore formed in said passage;

a valve body rotating within said case to change the opening of said opening-closing passage; and driving means installed to said case, connected to said valve body, said intake control valve being drive in timed relation with the operation of an intake valve mounted at the inlet of a combustion chamber of said internal combustion engine, controlling, by each intake stroke, the amount of intake air being supplied into said combustion chamber of said internal combustion engine.

* * * * *